(12) United States Patent
Sugiyama

(10) Patent No.: US 9,176,320 B2
(45) Date of Patent: Nov. 3, 2015

(54) OPTICAL SCANNING APPARATUS

(71) Applicant: Yosuke Sugiyama, Gifu (JP)

(72) Inventor: Yosuke Sugiyama, Gifu (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 14/185,954

(22) Filed: Feb. 21, 2014

(65) Prior Publication Data

US 2014/0233081 A1 Aug. 21, 2014

(30) Foreign Application Priority Data

Feb. 21, 2013 (JP) ................................ 2013-032128

(51) Int. Cl.
*G02B 26/08* (2006.01)
*G02B 26/12* (2006.01)

(52) U.S. Cl.
CPC ............ *G02B 26/124* (2013.01); *G02B 26/123* (2013.01)

(58) Field of Classification Search
CPC ...... G02B 26/08; G02B 26/10; G02B 26/123; G02B 26/124; B41J 2/451; B41J 2/473
USPC ............ 359/204.1–204.4; 347/233, 243–244, 347/258–261
See application file for complete search history.

(56) References Cited

U.S. PATENT DOCUMENTS

| | | | |
|---|---|---|---|
| 6,833,855 B2 | 12/2004 | Yoshida | |
| 7,525,709 B2 * | 4/2009 | Kimura | 359/204.1 |
| 7,986,334 B2 | 7/2011 | Bannai et al. | |
| 2002/0154208 A1 | 10/2002 | Yoshida | |
| 2009/0066780 A1 | 3/2009 | Bannai et al. | |

FOREIGN PATENT DOCUMENTS

| | | |
|---|---|---|
| JP | 2002-323664 A | 11/2002 |
| JP | 2005-242131 A | 9/2005 |
| JP | 2009-069178 A | 4/2009 |

OTHER PUBLICATIONS

Computer generated English language translation for Japanese Patent Publication No. 2005-242131 dated Sep. 8, 2005 obtained from <https://www.j-platpatinpit.go.jp/web/allitop/BTmTopEnglishPage>.

* cited by examiner

*Primary Examiner* — James Phan
(74) *Attorney, Agent, or Firm* — Banner & Witcoff, Ltd.

(57) ABSTRACT

An optical scanning apparatus includes first and second light sources configured to emit first and second light fluxes respectively, a deflector having a reflecting surface which reflects the first and second light fluxes, and configured to deflect the first and second light fluxes in a main scanning direction, and an imaging lens configured to let the first and second light fluxes through and form an image of the first and second light fluxes on the reflecting surface of the deflector. The imaging lens has a first incident surface into which the first light flux enters at a right angle, a second incident surface into which the second light flux enters at a right angle, a first outgoing surface from which the first light flux exits, and a second outgoing surface which makes an angle with the first outgoing surface and from which the second light flux exits.

9 Claims, 10 Drawing Sheets

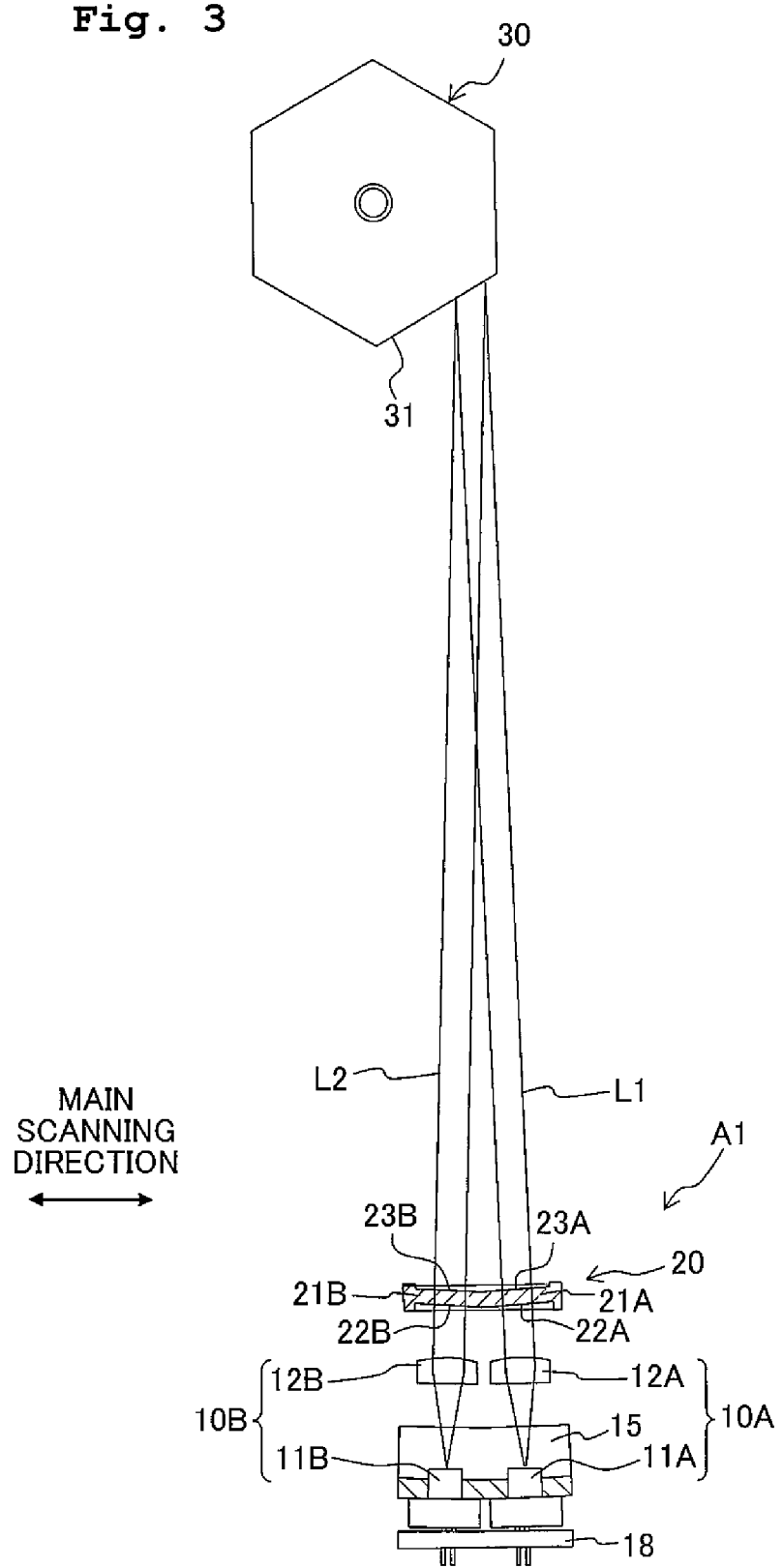

OPTICAL SCANNING APPARATUS

CROSS REFERENCE TO RELATED APPLICATION

The present application claims priority from Japanese Patent Application No. 2013-032128, filed on Feb. 21, 2013, the disclosure of which is incorporated herein by reference in its entirety.

BACKGROUND OF THE INVENTION

1. Field of the Invention

The present invention relates to an optical scanning apparatus and particularly to an optical scanning apparatus which can be made compact with a small number of components and which has an improved optical performance.

2. Description of the Related Art

An image forming apparatus such as a laser printer is provided with an optical scanning apparatus in which laser light irradiated from a light source and deflected by a deflector such as a polygon mirror is scanned on a surface of a photosensitive body (surface to be scanned) for exposing the photosensitive body on which an electrostatic latent image is formed.

Moreover, in a case of an image forming apparatus which carries out color printing, a plurality of light sources are provided corresponding to printing by a plurality of colors. An arrangement, in which two light fluxes irradiated from two light sources pass through one imaging lens and enter into one deflector, has been known as an arrangement for reducing the number of components of the optical scanning apparatus. In the arrangement, the two light fluxes make an angle mutually, and obliquely enter into a lens surface of the imaging lens.

SUMMARY OF THE INVENTION

However, when a light flux obliquely enters into an incident surface of the imaging lens in the arrangement, an aberration becomes large and a focal depth becomes small, thereby causing incapability of forming an image highly accurately.

The present invention has been made in view of the above-mentioned circumstances, and an object of the present invention is to provide an optical scanning apparatus which can be made compact with a small number of components and which has an improved optical performance.

According to an aspect of the present invention, there is provided an optical scanning apparatus including a first light source configured to emit first light flux; a second light source configured to emit second light flux; a deflector having a reflecting surface which reflects the first light flux and the second light flux, and configured to deflect the first light flux and the second light flux in a main scanning direction; and an imaging lens configured to let the first light flux and the second light flux through and form an image of the first light flux and the second light flux on the reflecting surface of the deflector, wherein the imaging lens has: a first incident surface into which the first light flux enters at a right angle when viewed from a sub scanning direction which is orthogonal to the main scanning direction; a second incident surface which is arranged side-by-side in the main scanning direction with respect to the first incident surface and into which the second light flux enters at a right angle when viewed from the sub scanning direction; a first outgoing surface from which the first light flux exits; and a second outgoing surface which is arranged side-by-side in the main scanning direction with respect to the first outgoing surface, which makes an angle with the first outgoing surface when viewed from the sub scanning direction, and from which the second light flux exits.

According to the optical scanning apparatus according to the aspect of the present invention, since the first light flux emitted from the first light source and the second light flux emitted from the second light source enter into one imaging lens and form an image on the same reflecting surface of the deflector, it is possible to reduce the number of components of the imaging lens. Moreover, since it is possible to bring the first light flux and the second light flux closer as compared with a case in which two imaging lenses are used, it is possible to make the optical scanning apparatus compact. Furthermore, since the first light flux enters into the first incident surface at a right angle and the second light flux enters into the second incident surface at a right angle, it is possible to make aberration small and to form an image highly accurately.

BRIEF DESCRIPTION OF THE DRAWINGS

FIG. 3 is an enlarged view of a deflector and one of incident optical systems in FIG. 1.

DETAILED DESCRIPTION OF THE PREFERRED EMBODIMENTS

First Embodiment

Figure 1:
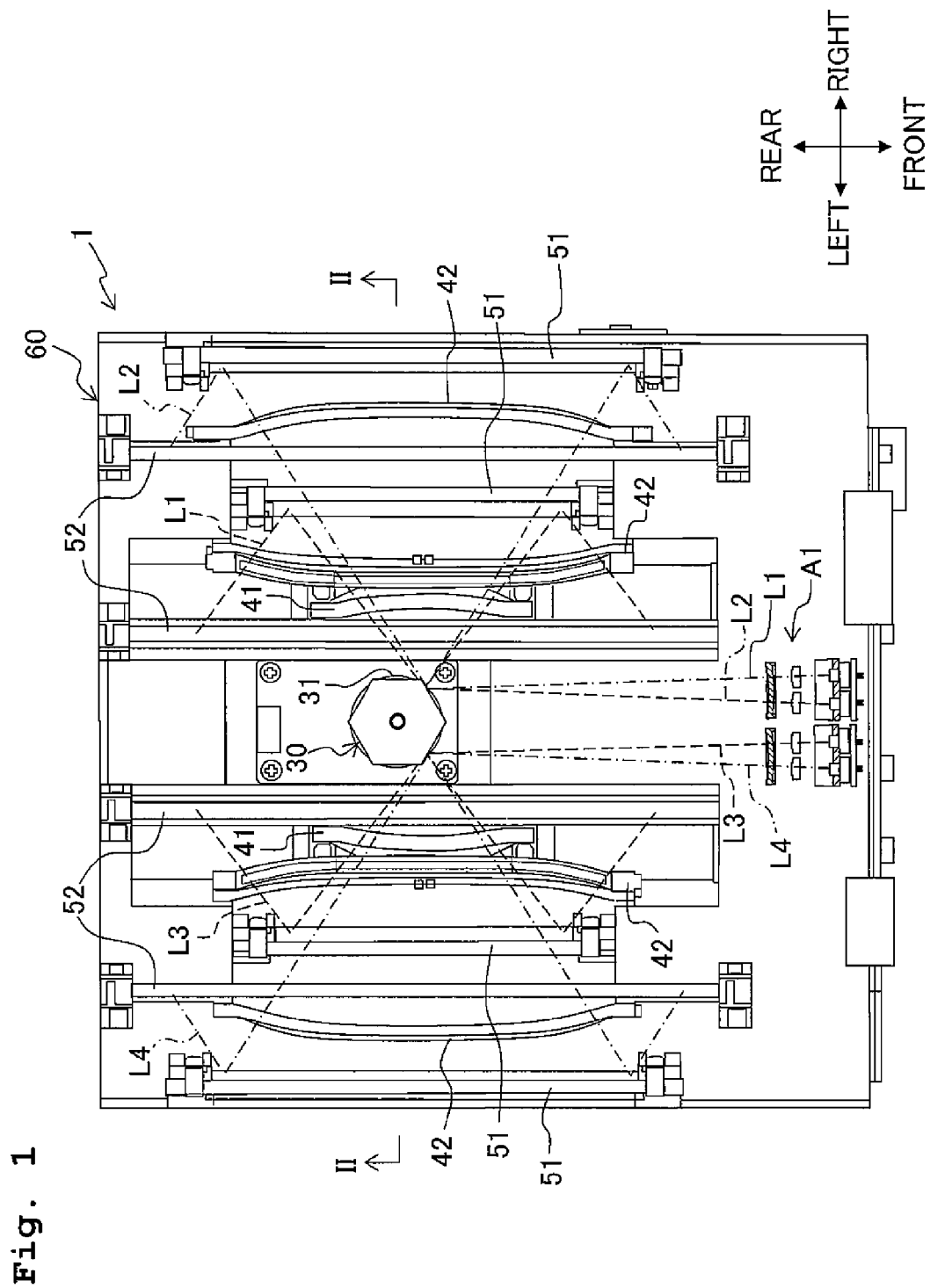
FIG. 1 is a plan view of an optical scanning apparatus according to a first embodiment of the present invention.
Figure 2:
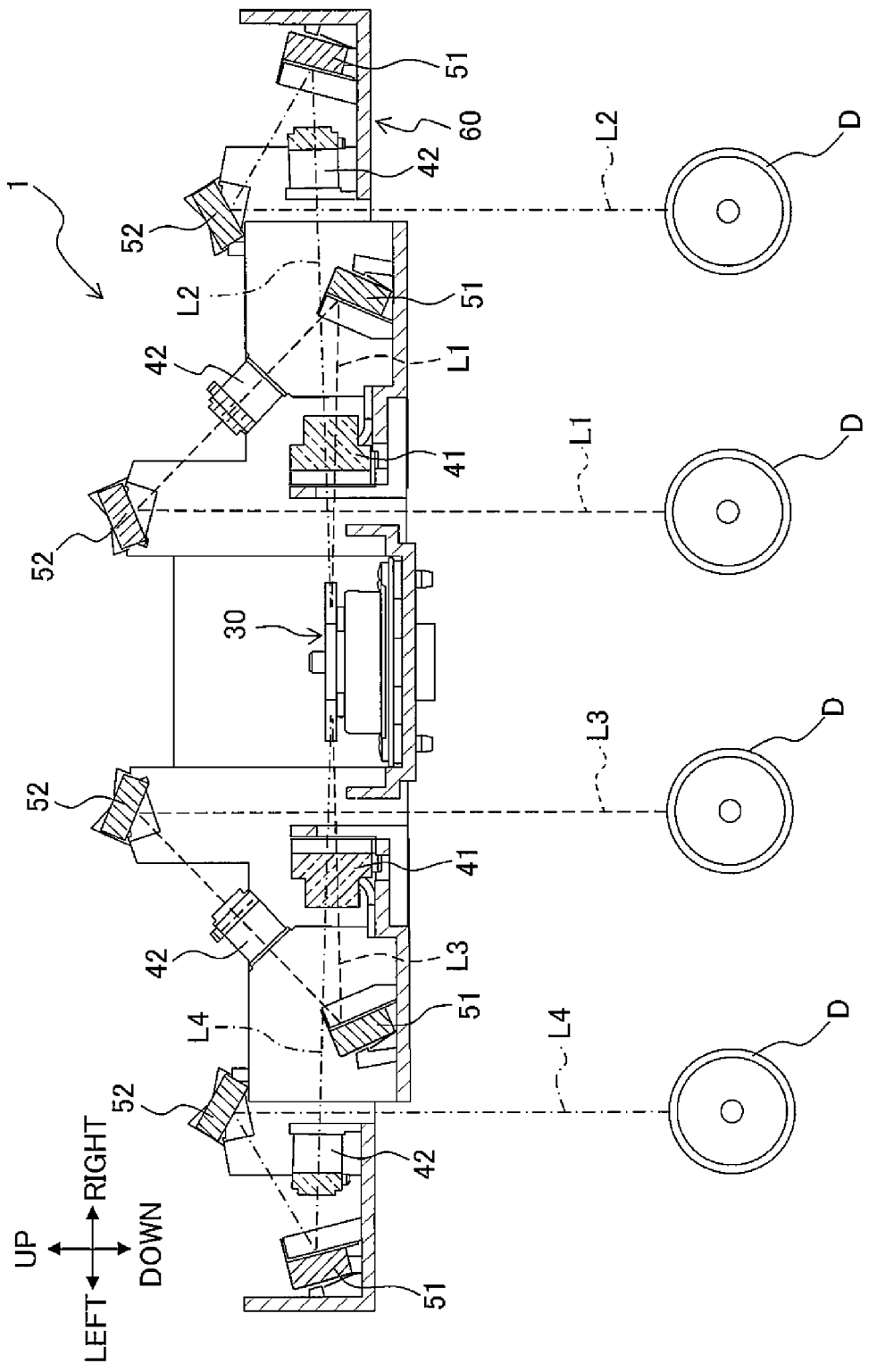
FIG. 2 is a cross-sectional view taken along a line II-II in FIG. 1.

Next, a first embodiment of the present invention will be described below in detail while referring to the accompanying diagrams. As shown in FIG. 1 and FIG. 2, an optical scanning apparatus 1 includes an incident optical system A1, a polygon mirror 30 as an example of a deflector, fθ lenses 41, cylindrical lenses 42, and reflecting mirrors 51 and 52 arranged in a casing 60. The optical scanning apparatus 1 is used in an electrophotographic color printer which realizes color printing by using four colors namely, cyan, yellow, magenta, and black, and four light fluxes namely, a first light flux L1, a second light flux L2, a third light flux L3, and a fourth light flux L4 (hereinafter, "first light flux L1 to fourth light flux L4") are emitted from the incident optical system A1 corresponding to four photosensitive drums D (refer to FIG. 2) subjected to scan exposure by the optical scanning apparatus 1. The polygon mirror 30 has a plurality of reflecting surfaces 31 provided at positions equidistant from a center of rotation. In the embodiment, six reflecting surfaces 31 are provided as an example. The first light flux L1 to fourth light flux L4 are incident on the reflecting surfaces 31 of the polygon mirror 30, and are deflected in a main scanning direction in a plane substantially parallel to a paper surface of FIG. 1.

In the following description, the "main scanning direction" is a direction orthogonal to a travelling direction of a light flux, and is a direction in which the light flux is deflected by the deflector. Even if the "main scanning direction" is a direction which differs spatially, it is to be used with the light flux as a reference. The "sub scanning direction" is a direction orthogonal to both the travelling direction of the light flux and the main scanning direction. Furthermore, in the following description, upward, downward, frontward, rearward, leftward, and rightward are defined as upward, downward, frontward, rearward, leftward, and rightward in a state shown in each of FIG. 1 and FIG. 2, irrespective of upward, downward, frontward, rearward, leftward, and rightward at the time of using practically.

An optical axis of the first light flux L1 and an optical axis of the second light flux L2 are not parallel mutually when viewed from the sub scanning direction and make an angle so that the first light flux L1 and the second light flux L2 are incident on the same reflecting surface 31 of the polygon mirror 30. Moreover, the first light flux L1 and the second light flux L2, as shown in FIG. 1 and FIG. 2, after passing through the common fθ lens 41, are reflected at the reflecting mirrors 51 and 52 provided separately, and upon passing through the cylindrical lens 42, are guided to photosensitive drums D respectively.

Each optical element of the optical scanning apparatus 1 is arranged to be bilaterally symmetrical with a center of rotation of the polygon mirror 30 as a reference, and also the third light flux L3 and the fourth light flux L4 are guided to photosensitive drums D respectively by a path bilaterally symmetric with the first light flux L1 and the second light flux L2. Therefore, in the following description of the incident optical system A1, only components corresponding to the first light flux L1 and the second light flux L2 will be described, and the description of components corresponding to the third light flux L3 and the fourth light flux L4 will be omitted.

As shown in FIG. 3, the incident optical system A1 includes a first light source 10A which emits the first light flux L1, a second light source 10B which emits the second light flux L2, and an imaging lens 20 through which the first light flux L1 and the second light flux L2 pass, and which forms an image of the first light flux L1 and the second light flux L2 on the same reflecting surface 31 of the polygon mirror 30. The first light source 10a includes a semiconductor laser 11A as a light emitting element and a collimating lens 12A, and the second light source 10B includes a semiconductor laser 11B as a light emitting element and a collimating lens 12B.

The semiconductor laser 11A is an element which emits laser light from one point light source, and is positioned and fixed to a base 15 which is for positioning. The semiconductor laser 11B is same as the semiconductor laser 11A, and is positioned and fixed to the base 15 which is for positioning. The semiconductor laser 11A and the semiconductor laser 11B are arranged to make an angle mutually such that optical axes of light fluxes that are emitted make an angle and are not mutually parallel when viewed from the sub scanning direction. In other words, a positioning portion of the base 15 is arranged to support the semiconductor laser 11A and the semiconductor laser 11B to be misaligned slightly as compared with a state in which the semiconductor lasers 11A and 11B are arranged in parallel to each other.

The collimating lens 12A is a lens which converts diffused laser light emitted from the semiconductor laser 11A as a point light source to a substantially parallel light flux. The collimating lens 12A is arranged such that an optical axis thereof coincides with an optical axis (central line) of the laser light emitted from the semiconductor laser 11A. The collimating lens 12B is same as the collimating lens 12A, and is arranged in front of the semiconductor laser 11B similar to the positioning relationship of the semiconductor laser 11A and the collimating lens 12A.

Figure 4A:
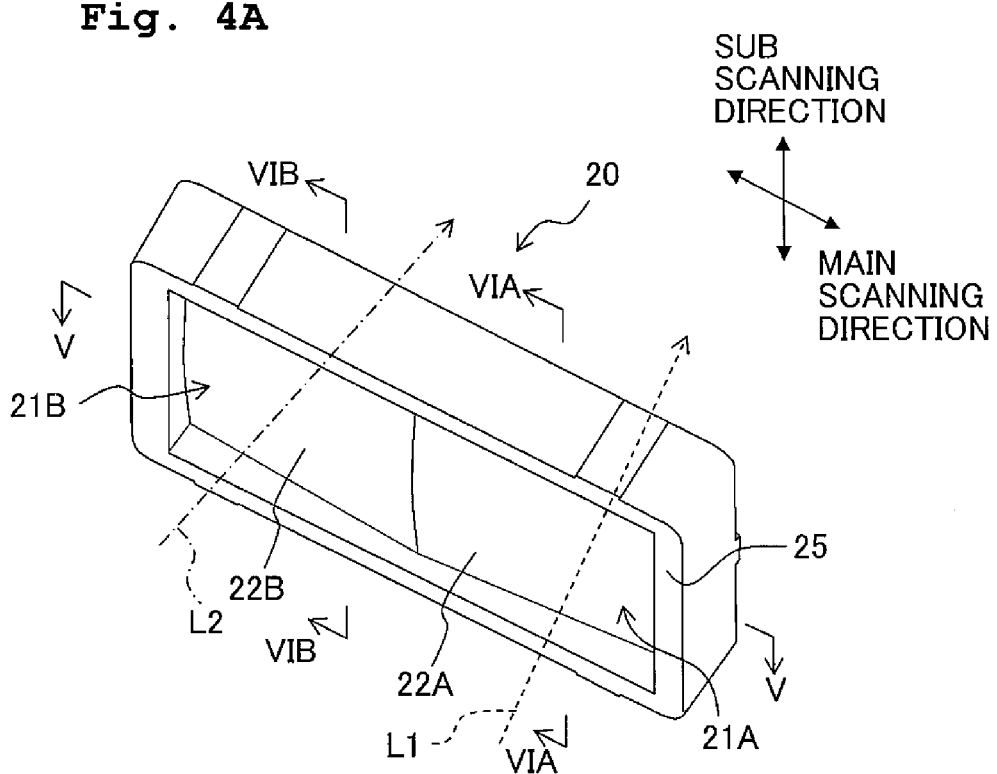
FIG. 4A is a perspective view when an imaging lens is viewed from a light incident side.
Figure 4B:
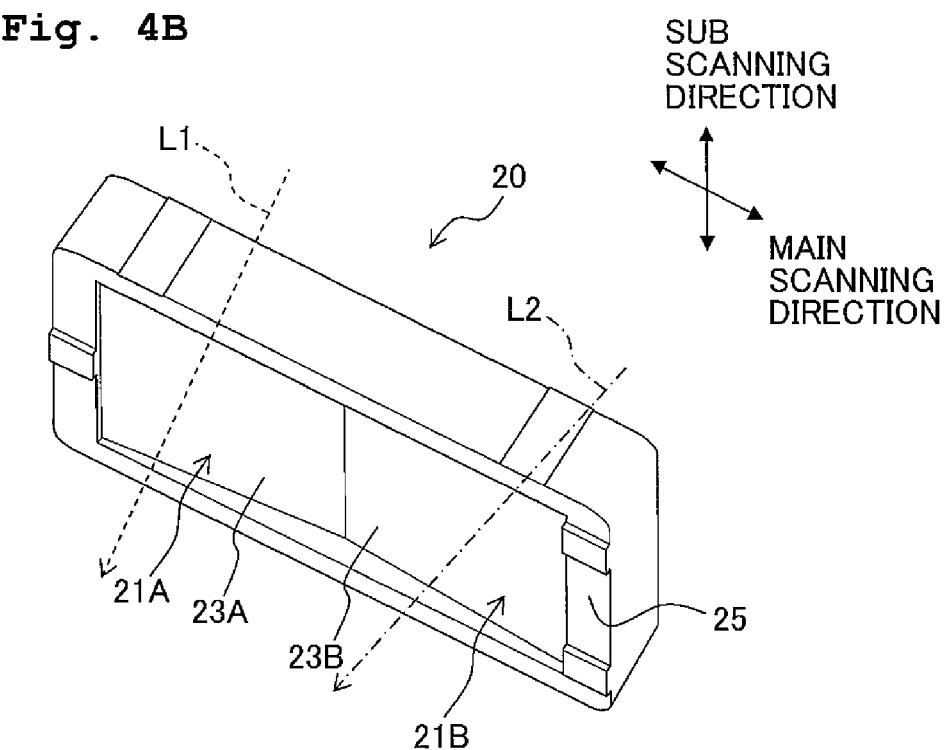
FIG. 4B is a perspective view when the imaging lens is viewed from a light emergence side.

One imaging lens 20 is provided for the first light flux L1 and the second light flux L2. The imaging lens 20 is a lens through which the first light flux L1 and the second light flux L2 pass. The imaging lens 20 converges the first light flux L1 and the second light flux L2 in the sub scanning direction on the reflecting surface 31 of the polygon mirror 30, and forms images in the form of lines extending in the main scanning direction on the reflecting surface 31. In the embodiment, the first light flux L1 and the second light flux L2 are formed as images at an overlapping position on the reflecting surface 31. As shown in FIG. 4A and FIG. 4B, the imaging lens 20 has a first lens portion 21A through which the first light flux L1 passes, and a second lens portion 21B which is arranged side-by-side in the main scanning direction with respect to the first lens portion 21A and through which the second light flux L2 passes. The first lens portion 21A and the second lens portion 21B are integrated, and a frame portion 25 is provided to be integrated with the first lens portion 21A and the second lens portion 21B around the first lens portion 21A and the second lens portion 21B. The first lens portion 21A, the second lens portion 21B, and the frame portion 25 are formed (molded) integrally by a resin or glass.

Figure 6A:
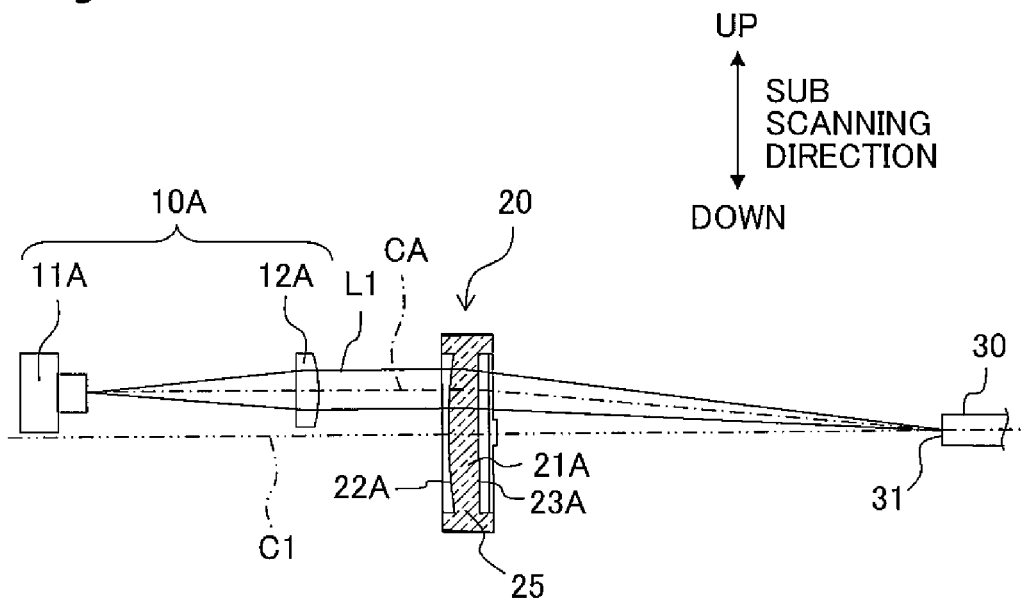
FIG. 6A is a diagram showing an arrangement of a first light source, a collimating lens, a polygon mirror, and a cross-sectional view along a line VIA-VIA of the imaging lens in FIG. 4A.
Figure 6B:
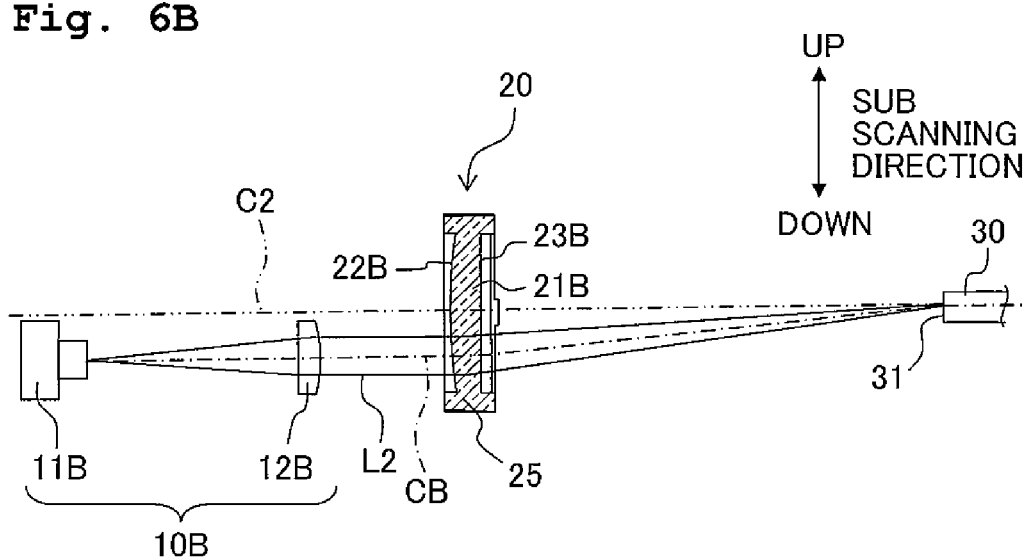
FIG. 6B is a diagram showing an arrangement of a second light source, a collimating lens, a polygon mirror, and a cross-sectional view along a line VIB-VIB of the imaging lens in FIG. 4A.

As shown in FIG. 4A, the first lens portion 21A has a first incident surface 22A into which the first light flux L1 enters, and the second lens portion 21B has a second incident surface 22B into which the second light flux L2 enters. The first incident surface 22A and the second incident surface 22B are arranged side-by-side in the main scanning direction. The first incident surface 22A is a cylindrical surface which is convex toward an outer side, or in other words, toward the first light source 10A, and as shown in FIG. 6A, has a circular arc shape in a cross-section along the sub scanning direction (cross-section orthogonal to the main scanning direction). The second incident surface 22B as well, has the same radius of curvature as of the first incident surface 22A, and is a cylindrical surface which is convex toward an outer side, or in other words, toward the second light source 10B. As shown in FIG. 6B, the second incident surface 22B also has a circular arc shape in a cross-section along the sub scanning direction. In other words, the first incident surface 22A and the second incident surface 22B are cylindrical lenses having refractive powers to converge the first light flux L1 and the second light flux L2 respectively. Besides, the refractive power of the first incident surface 22A and the refractive power of the second incident surface 22B are same. In FIG. 4A, the first incident surface 22A is a cylindrical surface having a center line along the main scanning direction which is orthogonal to an incident direction of the first light flux L1, and the second incident surface 22B is a circular cylindrical surface having a center line along the main scanning direction which is orthogonal to an incident direction of the second light flux L2.

Moreover, as shown in FIG. 4B, the first lens portion 21A has a first outgoing surface 23A from which the first light flux L1 emerges, and the second lens portion 21B has a second outgoing surface 23B from which the second light flux emerges. Both the first outgoing surface 23A and the second outgoing surface 23B are flat surfaces.

Figure 5:
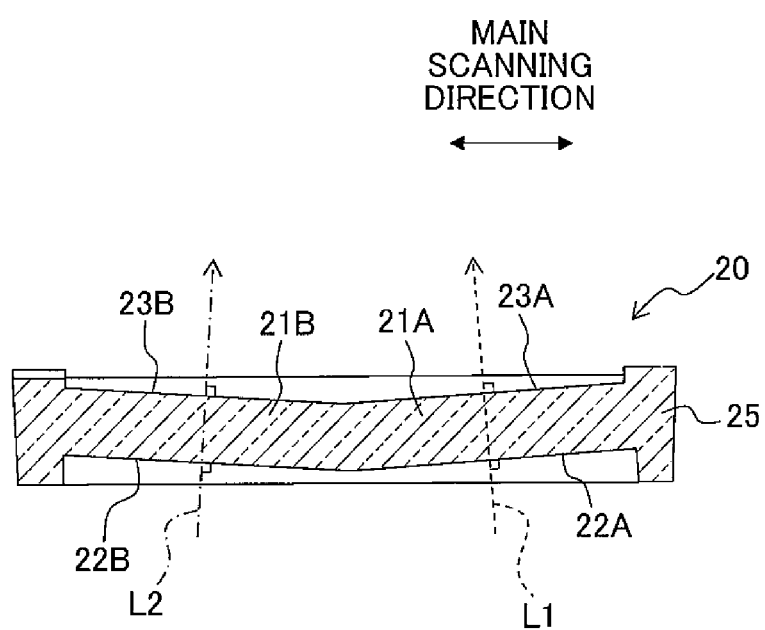
FIG. 5 is a cross-sectional view taken along a line V-V of the imaging lens in FIG. 4A.

As shown in FIG. 5, the first incident surface 22A is configured such that the first light flux L1 enters into the first incident surface 22A at a right angle when viewed the cross-section along the main scanning direction (when viewed from the sub scanning direction). Similarly, the second incident surface 22B is also configured such that the second light flux L2 enters into the second incident surface 22B at a right angle when viewed the cross-section along the main scanning direction (when viewed from the sub scanning direction). In other words, the first incident surface 22A and the second incident surface 22B are not parallel in the cross-section along the main scanning direction (when viewed from the sub scanning direction), and slightly make an angle mutually.

The first outgoing surface 23A is parallel to the first incident surface 22A in the cross-section along the main scanning direction (when viewed from the sub scanning direction), and is configured such that the first light flux L1 exits at a right angle. Similarly, the second outgoing surface 23B is parallel to the second incident surface 22B in the cross-section along the main scanning direction (when viewed from the sub scanning direction), and is configured such that the second light flux L2 exits at a right angle. In other words, the first outgoing surface 23A and the second outgoing surface 23B are not parallel in the cross-section along the main scanning direction (when viewed from the sub scanning direction), and slightly make an angle mutually.

As shown in FIG. 6A and FIG. 6B, a position of the first light source 10A and a position of the second light source 10B are different from each other in the sub scanning direction. Concretely, the first light source 10A is arranged such that an optical axis CA of the first light flux L1 is shifted upward with respect to a center line C1 in an optical axial direction passing through a vertex (a portion nearest to the first light source 10A in FIG. 6A) of the cylindrical surface of the first incident surface 22A. Moreover, the second light source 10B is arranged such that an optical axis CB of the second light flux L2 is shifted downward with respect to a center line C2 in an optical axial direction passing through a vertex (a portion nearest to the second light source 10B in FIG. 6B) of the cylindrical surface of the second incident surface 22B. The center line C1 in the optical axial direction of the first incident surface 22A and the center line C2 in the optical axial direction of the second incident surface 22B are at same position in a vertical direction (sub scanning direction).

Moreover, the optical axis CA of the first light flux L1 and the optical axis CB of the second light flux L2 before entering into the first incident surface 22A and the second incident surface 22B are mutually parallel when viewed from the main scanning direction. Therefore, the first light flux L1 enters at a position on an upper side of the center line C1 in the optical axial direction and the second light flux L2 enters at a position on a lower side of the center line C2 in the optical axial direction. In other words, the first light flux L1 and the second light flux L2 enter at positions on mutually opposite sides sandwiching the optical center of the imaging lens 20. An arrangement is made such that the first light flux L1 exited from the imaging lens 20 is exited to be slightly inclined downward, and the second light flux L2 exited from the imaging lens 20 is exited to be slightly inclined upward, and both the first light flux L1 and the second light flux L2 are incident at positions of substantially same height of the reflecting surface 31 of the polygon mirror 30. Moreover, since the first light flux L1 and the second light flux L2 are incident to be slightly inclined with respect to the optical center of the imaging lens 20, the first light flux L1 and the second light flux L2 are reflected in different directions by the polygon mirror 30.

By the aforementioned arrangement of the first light source 10A and the second light source 10B, the semiconductor laser 11A and the semiconductor laser 11B are slightly inclined mutually when viewed from the sub scanning direction (refer to FIG. 3). However, since the semiconductor laser 11A and the semiconductor laser 11B are not inclined with respect to the vertical direction when viewed from the main-scanning direction, it is possible to arrange the semiconductor lasers 11A and 11B in one common circuit board 18.

According to the optical scanning apparatus 1 arranged as aforementioned, since the first light flux L1 emitted from the first light source 10A and the second light flux L2 emitted from the second light source 10B enter into one imaging lens 20, and are formed as images on the same reflecting surface 31 of the polygon mirror 30, it is possible to reduce the number of the imaging lens 20 as compared with a case in which a separate imaging lens is provided for each light flux. Moreover, since it is possible to bring the first light flux L1 and the second light flux L2 closer by bringing the first lens portion 21A and the second lens portion 21B closer as compared with a case in which separate imaging lenses are used, it is possible to make the optical scanning apparatus 1 compact. Furthermore, since the first light flux L1 enters into the first incident surface 22A at a right angle and the second light flux L2 enters into the second incident surface 22B at a right angle, it is possible to make an aberration small, and to form images highly accurately on the reflecting surface 31 and the surface of the photosensitive drum D.

Moreover, by imparting refractive powers to the surfaces of the imaging lens 20 on which the first light flux L1 and the second light flux L2 enter, it is possible to make the aberration smaller as compared with a case in which the refractive power is imparted mainly to an emergence side.

Moreover, since the first incident surface 22A and the second incident surface 22B are cylindrical lenses having cylindrical surfaces which are convex toward outer side, manufacturing of the first and second incident surfaces 22A and 22B is easy.

Furthermore, the position of the first light source 10A and the position of the second light source 10B are different in the sub scanning direction, and also the positions at which the first light flux L1 and the second light flux L2 enter into the imaging lens 20 are different in the sub scanning direction. The first light flux L1 and the second light flux L2 which exited from the imaging lens 20 are incident on the reflecting surface 31 of the polygon mirror 30 making an angle mutually when viewed from the main scanning direction. Therefore, since it is possible to separate the first light flux L1 and the second light flux L2 deflected at the polygon mirror 30 in the sub scanning direction, it is possible to arrange the first light source 10A and the second light source 10B to be closer as compared with the case in which the light fluxes are separated in the main scanning direction, and to make the optical scanning apparatus 1 compact.

Moreover, by letting the optical axis CA of the first light flux L1 and the optical axis CB of the second light flux L2 to be parallel when viewed from the main scanning direction, it is possible to arrange the semiconductor laser 11A and the semiconductor laser 11B on the common circuit board 18, thereby making assembling of the semiconductor lasers 11A and 11B easy, and it is possible to facilitate cost reduction.

Moreover, in the optical scanning apparatus 1 of the embodiment, since the first incident surface 22A and the first outgoing surface 23A are parallel in the cross-section along the main scanning direction, and the second incident surface 22B and the second outgoing surface 23B are parallel in the cross-section along the main scanning direction, it is possible to make the aberration particularly small.

Second Embodiment

Next, a second embodiment of the present invention will be described below. Only points which differ from the first embodiment will be described in the second embodiment. Same reference numerals will be assigned to components which are same as in the first embodiment, and description of such components will be omitted.

Figure 7A:
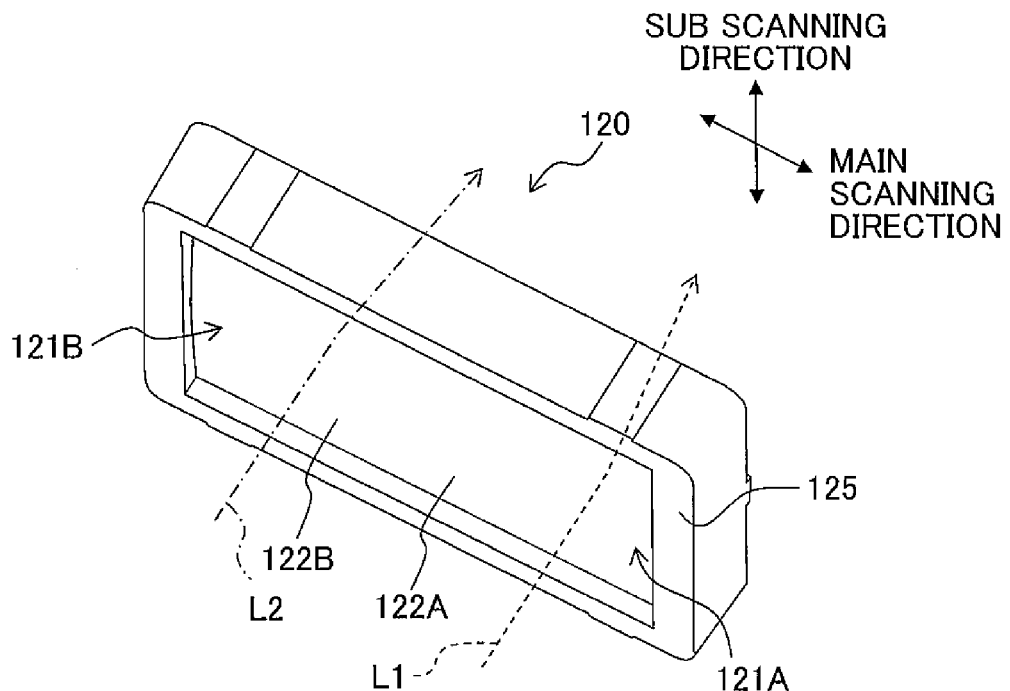
FIG. 7A is a perspective view when an imaging lens in a second embodiment is viewed from a light incident side.
Figure 7B:
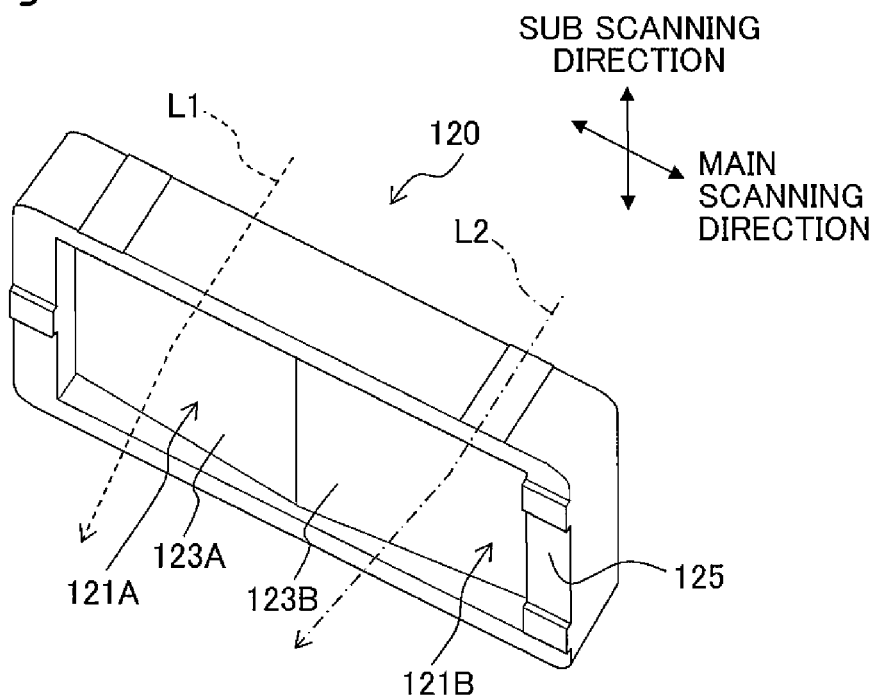
FIG. 7B is a perspective view when the imaging lens in the second embodiment is viewed from a light emergence side.

In an optical scanning apparatus according to the second embodiment, a structure of an imaging lens and an arrangement of semiconductor lasers differ from the structure and the arrangement in the first embodiment. As shown in FIG. 7A and FIG. 7B, in the second embodiment, one imaging lens 120 is provided for the first light flux L1 and the second light flux L2. The imaging lens 120 has a first lens portion 121A through which the first light flux L1 passes and a second lens portion 121B which is arranged side-by-side in the main scanning direction with respect to the first lens portion 121A and through which the second light flux L2 passes. The first lens portion 121A and the second lens portion 121B are integrated, and furthermore, a frame portion 125 is provided to be integrated with the first lens portion 121A and the second lens portion 121B around the first lens portion 121A and the second lens portion 121B. The first lens portion 121A, the second lens portion 121B, and the frame portion 125 are formed (molded) integrally by a resin or glass.

Figure 8A:
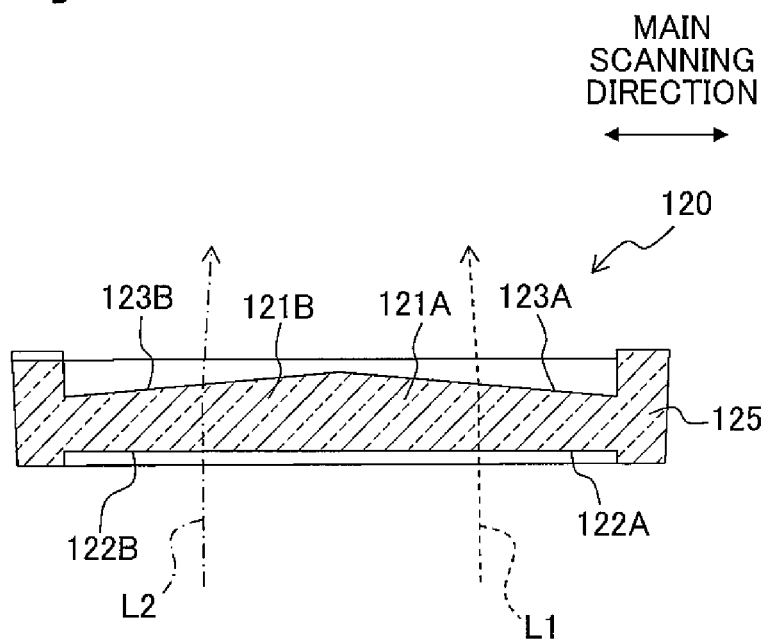
FIG. 8A is a cross-sectional view in a main scanning direction of the imaging lens in the second embodiment.
Figure 8B:
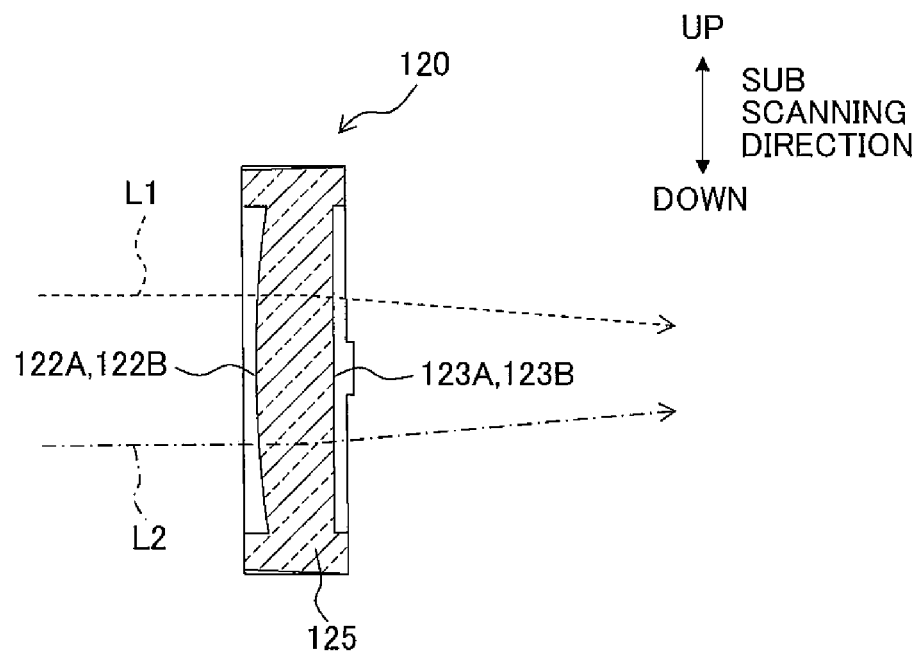
FIG. 8B is a cross-sectional view in a sub scanning direction of the imaging lens in the second embodiment.

As shown in FIG. 7A and FIG. 8B, a first incident surface 122A of the first lens portion 121A and a second incident surface 122B of the second lens portion 121B are both cylindrical surfaces projected toward an outer side (cylindrical surfaces with a line extending in the main scanning direction as a center), and are formed as one continuous cylindrical surface. Therefore, the first incident surface 122A and the second incident surface 122B have refractive powers to converge the first light flux L1 and the second light flux L2 in the sub scanning direction, respectively. The first incident surface 122A and the second incident surface 122B have the same refractive powers and are mutually parallel when viewed from the sub scanning direction.

On the other hand, as shown in FIG. 7B, FIG. 8A and FIG. 8B, a first outgoing surface 123A of the first lens portion 121A and a second outgoing surface 123B of the second lens portion 121B are both flat surfaces. Moreover, as shown in FIG. 8A, the first outgoing surface 123A and the second outgoing surface 123B are not parallel in a cross-section along the main scanning direction, but slightly make an angle mutually. Therefore, the first outgoing surface 123A is not parallel to the first incident surface 122A in a cross-section along the main scanning direction, and similarly, the second outgoing surface 123B is not parallel to the second incident surface 122B in a cross-section along the main scanning direction. Moreover, the first outgoing surface 123A refracts the first light flux L1 in the main scanning direction, and the second outgoing surface 123B refracts the second light flux L2 in the main scanning direction. An optical axis of the first light flux L1 and an optical axis of the second light flux L2 before the first light flux L1 and the second light flux L2 enter into the first incident surface 122A and the second incident surface 122B respectively are parallel when viewed from any of the main scanning direction and the sub scanning direction.

Figure 9:
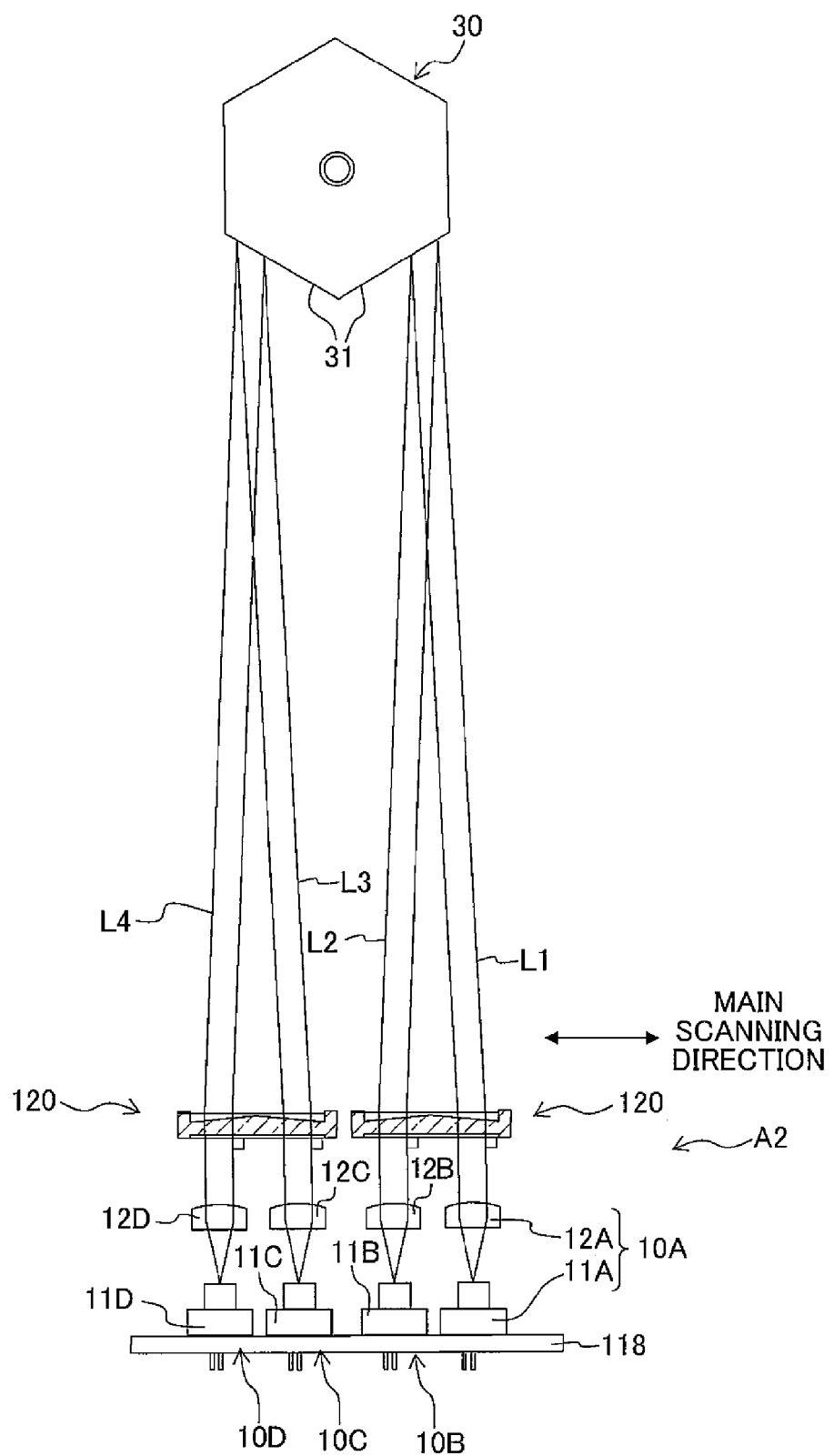
FIG. 9 is a plan view showing an arrangement of light sources, collimating lenses, imaging lenses, and the deflector in the second embodiment.

As shown in FIG. 9, an incident optical system A2 in the second embodiment includes four light sources namely, a first light source 10A, a second light source 10B, a third light source 10C, and a fourth light source 10D (hereinafter, also called as "first light source 10A to fourth light source 10D"). The incident optical system A2 is arranged such that the first light flux L1 and the second light flux L2 emitted from the first light source 10A and the second light source 10B respectively enter into one imaging lens 120, and a third light flux L3 and a fourth light flux L4 emitted from the third light source 10C and the fourth light source 10D respectively enter into another imaging lens 120. The first light source 10A to the fourth light source 10D have semiconductor lasers 11A, 11B, 11C, and 11D (hereinafter, "semiconductor lasers 11A to 11D"), and collimating lenses 12A, 12B, 12C, and 12D (hereinafter, "collimating lenses 12A to 12D"), respectively.

The two imaging lenses 120 are arranged side-by-side in the main scanning direction to be directed in the same direction. The first light source 10A to the fourth light source 10D are arranged such that the first light flux L1, the second light flux L2, the third light flux L3, and the fourth light flux L4 (hereinafter, "first light flux L1 to the fourth light flux L4") enter into incident surfaces of the two imaging lenses 120 at a right angle. The semiconductor lasers 11A to 11D are arranged side-by-side in the main scanning direction to be directed in the same direction, and the collimating lenses 12A to 12D also are arranged side-by-side in the main scanning direction to be directed in the same direction. Moreover, the four semiconductor lasers 11A to 11D are provided to one circuit board 118 in the form of a plate.

According to the optical scanning apparatus having the aforementioned arrangement, since the first incident surface 122A and the second incident surface 122B of the imaging lens 120 are continuous cylindrical surfaces, manufacturing is easy. Moreover, since it is possible to arrange the first light source 10A and the second light source 10B to be directed in the same direction, it is possible to arrange the semiconductor lasers 11A and 11B perpendicularly on one circuit board 118, thereby making the arrangement of the first light source 10A and the second light source 10B easy, and also making the manufacturing easy.

The embodiments of the present invention have been described above. However, the present invention is not restricted to the embodiments described above, and it is possible to make appropriate modifications.

Figure 10A:
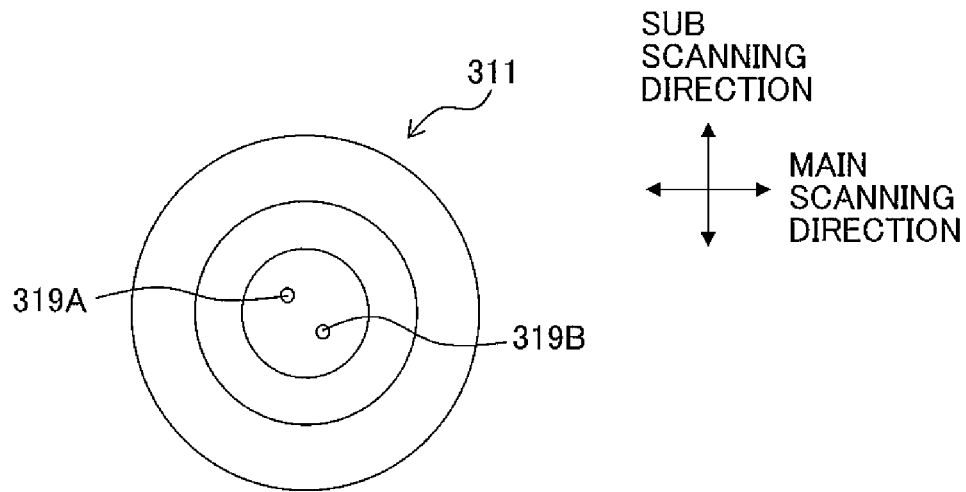
FIG. 10A is a diagram when a multi-beam semiconductor laser is viewed from a light emergence side.
Figure 10B:
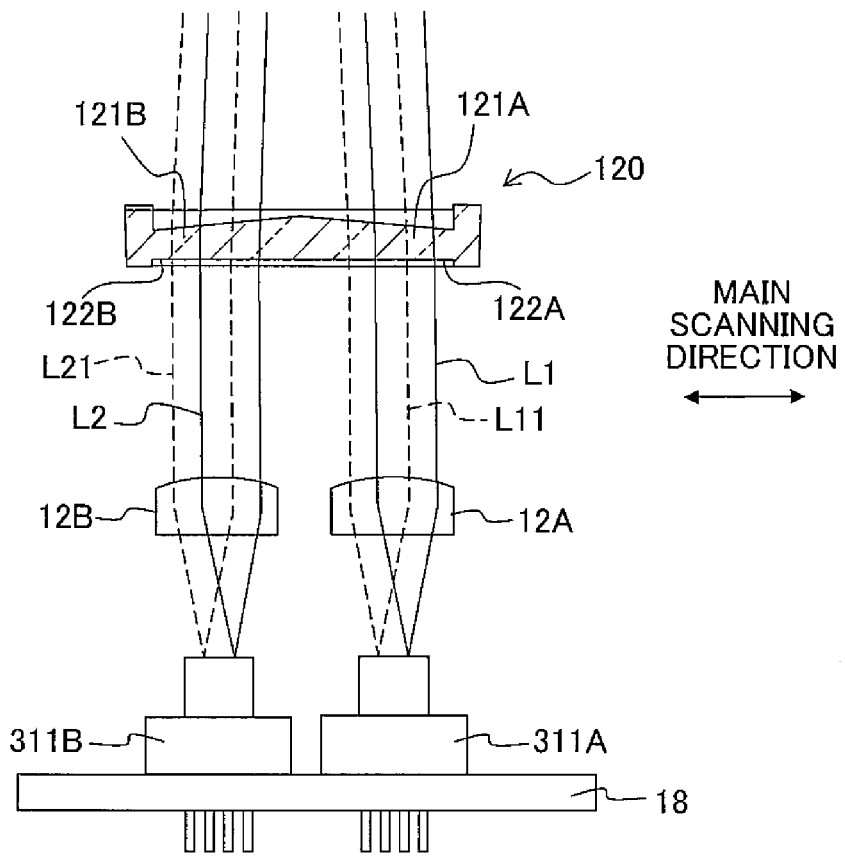
FIG. 10B is a plan view of an incident optical system using the multi-beam semiconductor laser.

For instance, in the embodiments, a semiconductor laser having one light emitting point has been exemplified as each of the semiconductor lasers 11A to 11D. However, as a semiconductor laser 311 shown in FIG. 10A, a multi-beam laser having a plurality of light emitting points such as two light emitting points 319A and 319B may be used. In this case, as shown in FIG. 10B, the first light flux L1 and a third light flux L11 which have been emitted from one semiconductor laser 311A and passed through the collimating lens 12A, pass through the first lens portion 121A, and the second light flux L2 and a fourth light flux L21 which have been emitted from the another semiconductor laser 311B and passed through the collimating lens 12B, pass through the second lens portion 121B. Here, since an optical axis of the first light flux L1 and an optical axis of the third light flux L11 are substantially parallel, it is possible to let the two light fluxes L1 and L11 enter into the first incident surface 122A at a right angle in a cross-section along the main scanning direction, and since an optical axis of the second light flux L2 and an optical axis of the fourth light flux L21 are substantially parallel, it is possible to let the two light fluxes L2 and L21 enter into the second incident surface 122B at a right angle in a cross-section along the main scanning direction. In other words, the present invention is also applicable to a case in which at least one light source is arranged to emit a plurality of light fluxes.

Moreover, in the embodiments, the imaging lens has been formed as one lens in which the two lens portions are combined. However, the imaging lens may be formed as one lens in which three or more lens portions are combined. Even in this case, it is preferable to make an arrangement such that each of the three or more light fluxes enters into one of incident surfaces of the lens portions at a right angle when viewed a cross-section along the main scanning direction, and outgoing surfaces make an angle mutually in a cross-section along the main scanning direction.

In the embodiments, the imaging lens is formed such that the incident surface is a convex curved surface which is projected toward the outer side and the outgoing surface is a flat surface. However, both the incident surface and the outgoing surface may be curved surfaces, or the incident surface may be a flat surface and the outgoing surface may be a curved surface. Moreover, it is also possible to use a diffraction lens as the imaging lens.

What is claimed is:

1. An optical scanning apparatus comprising:
a first light source configured to emit first light flux;
a second light source configured to emit second light flux;
a deflector having a reflecting surface which reflects the first light flux and the second light flux, and configured to deflect the first light flux and the second light flux in a main scanning direction; and
an imaging lens configured to let the first light flux and the second light flux through and form an image of the first light flux and the second light flux on the reflecting surface of the deflector,
wherein the imaging lens has:
a first incident surface into which the first light flux enters at a right angle when viewed from a sub scanning direction which is orthogonal to the main scanning direction;
a second incident surface which is arranged side-by-side in the main scanning direction with respect to the first incident surface and into which the second light flux enters at a right angle when viewed from the sub scanning direction;
a first outgoing surface from which the first light flux exits; and
a second outgoing surface which is arranged side-by-side in the main scanning direction with respect to the first outgoing surface, which makes an angle with the first outgoing surface when viewed from the sub scanning direction, and from which the second light flux exits.

2. The optical scanning apparatus according to claim 1, wherein the first incident surface has a refractive power to converge the first light flux in the sub scanning direction, and
the second incident surface has a refractive power to converge the second light flux in the sub scanning direction.

3. The optical scanning apparatus according to claim 2, wherein the first incident surface is a cylindrical surface which is convex toward the first light source, and
the second incident surface is a cylindrical surface which is convex toward the second light source.

4. The optical scanning apparatus according to claim 1, wherein the first light source and the second light source are arranged at different positions with respect to the sub scanning direction, and
with respect to the sub scanning direction, a position at which the first light flux enters into the first incident surface is different from a position at which the second light flux enters into the second incident surface.

5. The optical scanning apparatus according to claim 4, wherein an optical axis of the first light flux which enters into the first incident surface is parallel to an optical axis of the second light flux which enters into the second incident surface when viewed from the main scanning direction.

6. The optical scanning apparatus according to claim 1, wherein when viewed from the sub scanning direction, the first incident surface and the second incident surface make an angle, the first incident surface is parallel to the first outgoing surface, and the second incident surface is parallel to the second outgoing surface.

7. The optical scanning apparatus according to claim 1, wherein the first incident surface is parallel to the second incident surface when viewed from the sub scanning direction.

8. The optical scanning apparatus according to claim 7, wherein the first incident surface and the second incident surface are configured to form a continuous cylindrical surface.

9. The optical scanning apparatus according to claim 1, wherein at least one of the first light source and the second light source is configured to emit a plurality of light fluxes.

* * * * *